(12) United States Patent
Qureshi

(10) Patent No.: US 12,498,859 B2
(45) Date of Patent: Dec. 16, 2025

(54) SYSTEMS AND METHOD FOR TRACKING ACTIVATIONS TO PERFORM ROW HAMMER MITIGATION IN MEMORY MODULES

(71) Applicant: Georgia Tech Research Corporation, Atlanta, GA (US)

(72) Inventor: Moinuddin Qureshi, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 336 days.

(21) Appl. No.: 18/130,734

(22) Filed: Apr. 4, 2023

(65) Prior Publication Data
US 2023/0315299 A1 Oct. 5, 2023

Related U.S. Application Data

(60) Provisional application No. 63/327,518, filed on Apr. 5, 2022.

(51) Int. Cl.
| | | |
|---|---|---|
| *G06F 11/00* | (2006.01) | |
| *G06F 3/06* | (2006.01) | |
| *G06F 12/14* | (2006.01) | |
| *G06F 12/16* | (2006.01) | |
| *G06F 21/00* | (2013.01) | |
| *G06F 21/50* | (2013.01) | |
| *G08B 23/00* | (2006.01) | |

(52) U.S. Cl.
CPC .......... *G06F 3/0614* (2013.01); *G06F 3/0673* (2013.01); *G06F 21/00* (2013.01); *G06F 21/50* (2013.01)

(58) Field of Classification Search
CPC ..... G06F 3/0614; G06F 3/0638; G06F 3/0673
USPC .......................................................... 726/22
See application file for complete search history.

(56) References Cited

U.S. PATENT DOCUMENTS

| | | | | |
|---|---|---|---|---|
| 2014/0006704 | A1* | 1/2014 | Greenfield | G06F 11/3037 711/106 |
| 2019/0066808 | A1* | 2/2019 | Nale | G11C 11/406 |
| 2021/0065775 | A1* | 3/2021 | Hush | G11C 11/4078 |

OTHER PUBLICATIONS

"Spec cpu2017 benchmark suite," in Standard Performance Evaluation Corporation. [Online]. Available: http://www.spec.org/cpu2017/.
"half-double": Next-row-over assisted rowhammer. https://github.com/google/hammer-kit/blob/main/20210525_half_double.pdf.
(Continued)

*Primary Examiner* — Jeffrey C Pwu
*Assistant Examiner* — Samuel Ambaye
(74) *Attorney, Agent, or Firm* — Meunier Carlin & Curfman LLC

(57) ABSTRACT

A hybrid tracker system and method are disclosed for RH mitigation, which combines the best of both SRAM and DRAM to enable low-cost mitigation of RH at ultra-low thresholds. The system consists of two structures. First, an SRAM-based structure is provided that tracks aggregated counts at the granularity of a group of rows and is sufficient for the vast majority of rows, which receive only a few activations. Second, a per-row tracker stored in the DRAM-array is provided which can track an arbitrary number of rows; however, to limit performance overheads, this tracker is used only for the small number of rows that exceed the tracking capability of the SRAM-based structure.

16 Claims, 5 Drawing Sheets

(56) References Cited

OTHER PUBLICATIONS

Aweke, Z. B. et al., "Anvil:Software-based protection against next-generation rowhammer attacks," ACM SIGPLAN Notices, vol. 51, No. 4, pp. 743-755, 2016.
Bennett, T. et al., "Panopticon: A complete in-dram rowhammer mitigation," in Workshop on DRAM Security (DRAMSec), 2021.
Bienia, C. et al., "The parsec benchmark suite: Characterization and architectural implications," in Proceedings of the 17th international conference on Parallel architectures and compilation techniques, 2008, pp. 72-81.
Chatterjee, N. et al., "Usimm: the utah simulated memory module," University of Utah, Tech. Rep, 2012.
Cojocar, L. et al., "Exploiting correcting codes: On the effectiveness of ecc memory against rowhammer attacks," in 2019 IEEE Symposium on Security and Privacy (SP). IEEE, 2019, pp. 55-71.
Costan, V. and Devadas, S., "Intel sgx explained." IACR Cryptol. ePrint Arch., vol. 2016, No. 86, pp. 1-118, 2016.
Frigo, P. et al., "TRRespass: Exploiting the many sides of target row refresh," in 2020 IEEE Symposium on Security and Privacy (SP). IEEE, 2020, pp. 747-762.
Gruss, D. et al., "Another flip in the wall of rowhammer defenses," in 2018 IEEE Symposium on Security and Privacy (SP). IEEE, 2018, pp. 245-261.
Gruss, D., Maurice, C. and Mangard, S. "Rowhammer. js: A remote software-induced fault attack in javascript," in International conference on detection of intrusions and malware, and vulnerability assessment. Springer, 2016, pp. 300-321.
Jang, Y. et al., "Sgx-bomb: Locking down the processor via rowhammer attack," in Proceedings of the 2nd Workshop on System Software for Trusted Execution, 2017, pp. 1-6.
JEDEC Standard, "DDR4 SDRAM Standard JESD79-4B."
Kim, D.-H. et al., "Architectural support for mitigating row hammering in dram memories," IEEE CAL, vol. 14, No. 1, pp. 9-12, 2014.
Kim, J.S. et al., "Revisiting rowhammer: An experimental analysis of modern dram devices and mitigation techniques," in 2020 ACM/IEEE 47th ISCA. IEEE, 2020, pp. 638-651.
Kim, M. J. et al., "Mithril: Cooperative row hammer protection on commodity dram leveraging managed refresh," arXiv preprint arXiv:2108.06703, 2021.
Kim, Y. et al., "Flipping bits in memory without accessing them: An experimental study of dram disturbance errors," ACM SIGARCH Computer Architecture News, vol. 42, No. 3, pp. 361-372, 2014.
Kwong, A. et al., "Rambleed: Reading bits in memory without accessing them," in 2020 IEEE Symposium on Security and Privacy (SP). IEEE, 2020, pp. 695-711.
Lee, E. et al., "Twice: preventing row-hammering by exploiting time window counters," in Proceedings of the 46th International Symposium on Computer Architecture, 2019, pp. 385-396.
Micron. Ddr4 sdram datasheet. https://www.micron.com/-/media/client/global/documents/products/data-sheet/dram/ddr4/8gb_ddr4_sdram.pdf.
Muralimanohar, N., Balasubramonian, R. and Jouppi, N.P. "Cacti 6.0: A tool to model large caches," HP laboratories, vol. 27, 2009.
Park, Y. et al., "Graphene: Strong yet Lightweight Row Hammer Protection," in 2020 53rd Annual IEEE/ACM International Symposium on Microarchitecture (Micro). Athens, Greece: IEEE, Oct. 2020, pp. 1-13. [Online]. Available: https://ieeexplore.ieee.org/document/9251863/.
Beamer, K. A. S. and Patterson, D. "The gap benchmark suite," in arXiv preprint arXiv:1508.03619, 2015.
Seaborn, M. and Dullien, T., "Exploiting the dram rowhammer bug to gain kernel privileges," Black Hat, vol. 15, p. 71, 2015.
Seyedzadeh, S. M., et al., "Mitigating wordline crosstalk using adaptive trees of counters," in 2018 ACM/IEEE 45th Annual International Symposium on Computer Architecture (ISCA). IEEE, 2018, pp. 612-623.
Son, M. et al., "Making dram stronger against row hammering," in Proceedings of the 54th Annual Design Automation Conference 2017, 2017, pp. 1-6.
Van Der Veen, V. et al., "Drammer: Deterministic rowhammer attacks on mobile platforms," in Proceedings of the 2016 ACM SIGSAC conference on computer and communications security, 2016, pp. 1675-1689.
Yaglikci, A. G. et al., "Blockhammer: Preventing rowhammer at low cost by blacklisting rapidly accessed dram rows," in 2021 IEEE International Symposium on High-Performance Computer Architecture (HPCA). IEEE, 2021, pp. 345-358.
You, J. M. and Yang, J.-S. "Mrloc: Mitigating row-hammering based on memory locality," in 2019 56th ACM/IEEE Design Automation Conference (DAC). IEEE, 2019, pp. 1-6.
Zhang, Z. et al., "Pthammer: Cross-userkernel-boundary rowhammer through implicit accesses," in 2020 53rd Annual IEEE/ACM International Symposium on Microarchitecture (Micro). IEEE, 2020, pp. 28-41.

\* cited by examiner

SYSTEMS AND METHOD FOR TRACKING ACTIVATIONS TO PERFORM ROW HAMMER MITIGATION IN MEMORY MODULES

CROSS-REFERENCE TO RELATED APPLICATIONS

This application claims priority to U.S. Provisional Patent No. 63/327,518, filed on Apr. 5, 2022, entitled "METHOD OF MONITORING DRAM MEMORY AGAINST THE ROW-HAMMER PROBLEM." The contents of which are hereby incorporated by reference.

BACKGROUND

Relentless DRAM scaling has been the prime driver for enabling high-capacity memory chips. With each technology generation, the cells become smaller and closer, which is critical for increasing density. Unfortunately, packing cells closely increases inter-cell interference between neighboring devices. One such interference is row-hammer (RH), which occurs when a frequently accessed DRAM row causes bit-flips in the nearby rows. The bit-flips caused by RH are not just a reliability problem but a major security threat. For example, an attacker could flip bits in the page-tables to enable privilege escalation and access data stored at arbitrary locations. Furthermore, the bit-flips from RH are data-dependent, and this property can also be used to stealthily infer data stored in nearby rows.

The problem of RH has continued to worsen since the first demonstration. The severity of RH is typically characterized by the metric row-hammer threshold ($T_{RH}$), which denotes the number of row activations required in a given row to induce a bit-flip in the nearby rows. Over the last seven years, $T_{RH}$ has reduced by more than an order of magnitude, coming down from 139K in DDR3 (in 2014) to 4.8K for LPDDR4 (in 2020). $T_{RH}$ is expected to reduce even further, making RH an even more severe problem for future systems. Therefore, it is important that the solutions we develop for mitigating RH are effective not only for current $T_{RH}$ but also for the future, when $T_{RH}$ may reduce by another order of magnitude.

SUMMARY

A hybrid tracker system and method are disclosed for RH mitigation, which combines the best of both SRAM and DRAM to enable low-cost mitigation of RH at ultra-low thresholds. The system consists of two structures. First, an SRAM-based structure is provided that tracks aggregated counts at the granularity of a group of rows and is sufficient for the vast majority of rows, which receive only a few activations. Second, a per-row tracker stored in the DRAM-array is provided which can track an arbitrary number of rows; however, to limit performance overheads, this tracker is used only for the small number of rows that exceed the tracking capability of the SRAM-based structure.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
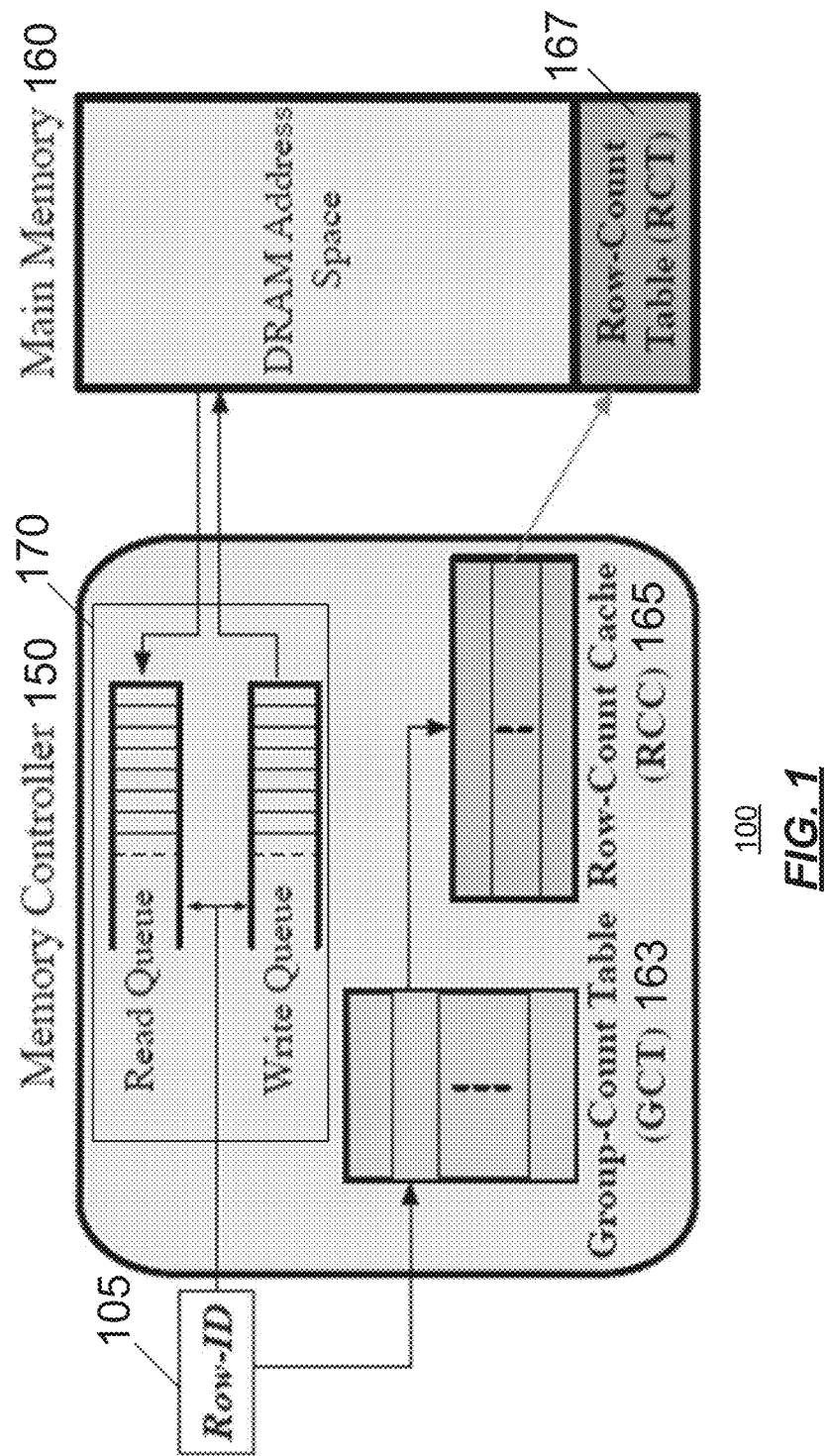
FIG. 1 is an illustration of an example memory device.

FIG. 1 is an illustration of an example memory device 100. In the example shown, the memory device 100 includes a memory controller 150 and a main memory 160. The main memory 160 may be a Dynamic Random Access Memory (DRAM). The main memory 160 may be divided into a plurality of rows with each row addressable in the DRAM address space.

As described above, one drawback associated with DRAM is that when rows are frequently activated (e.g., read from or written to) the values stored in adjacent rows may be changed. This is known as row hammer (RH).

Because the effects of RH are cumulative, one way to reduce the effects of RH is to monitor the activations of rows of the main memory 160, and to perform RM mitigation on the adjacent rows when the number of activations exceed some threshold. However, monitoring and recording row activations requires a large amount of memory and computing resources.

Accordingly, to reduce the amount of memory and computing resources that are needed to monitor activations for RH mitigation, the memory device 100 includes a group-count table 163 and a row-count table 167. The group-count table 163 may be stored in Synchronous Dynamic Random Access Memory (SRAM) which is faster than DRAM, while the row-count table 167 may be stored in a portion of main memory 160 reserved for the row-count table 167. In addition, the memory controller 150 may further include a row-count cache 165 that caches some or all of the row-count table 167 in the SRAM of the memory controller 150 to provide further performance improvements.

The memory controller 150 receives one or more activation requests from an associated computing device or operating system. These activation requests generally include read requests and write requests and are associated with row identifiers 105 that indicate the particular rows that are to be activated. The memory controller 150 may place activation requests in one or more read and write queues 170 depending on whether the activation requests are read or write requests. The memory controller 150 may then fulfill the activation requests from the queues 170. Depending on the embodiment, the memory controller 150 may be implemented using one or more general purpose computing devices such as the computing device 500 illustrated with respect to FIG. 5.

With respect to the group-count table 163, the rows of the main memory 160 may be divided into one or more groups with each group including a unique subset of rows of the plurality of rows. In addition, each row may be associated with only one group. Each group may be selected such that some subset of bits of the row identifiers 105 associated with rows in the group all map to the same group. Accordingly, when a row identifier 105 is received by the memory controller 150 its associated group can be quickly determined.

The number of groups may be dependent on the total number or rows in the main memory 160. Generally, the number of groups is selected to be much smaller than the total number of rows. For example, for a 4 million row main memory 160, 32 thousand groups may be used, with 128 rows assigned to each group. Other sized groups may be used.

The group-count table 163 is used by the memory controller 150 to count activations of rows on a group basis, rather than on an individual row basis until the number of activations reach some threshold. After the threshold is reached for a group, the memory controller 150 may instead use row-specific counts that are stored in the row-count table 167. By first counting activations on a group basis the amount of storage that is needed to count activations using the group-count table 163 is reduced and therefore can be stored in the faster SRAM memory, which greatly improves the speed of activation tracking and overall RH mitigation.

To facilitate the group-count table 163 (and as will be described further below the row-count table 167), several thresholds may be used. The first threshold is referred to herein as the group-count threshold ($T_G$) and is some fraction of a maximum number of activations that can be performed on a row of the main memory 160 before RH mitigation should be performed on one or more adjacent rows to avoid adverse effects due to RH (i.e., $T_{RH}$). The maximum number or $T_{RH}$ may be set by a manufacturer of the main memory 160 or a user or administrator.

The other threshold used by the memory controller 150 is referred to herein as the row-count threshold ($T_H$). This threshold may be greater than the group-count threshold $T_G$, but lower than the row hammer threshold $T_{RH}$. In some embodiments, where the $T_{RH}$ is 500, the $T_H$ is 250, and the $T_G$ is 200. Other values may be used.

The purpose of the group-count table 163 is to efficiently filter away row count updates for the vast majority of the rows that have only a few activations. In some embodiments. the group-count table 163 may be organized as an untagged table of counters, where each counter is sized to hold a count value of up to $T_G$. The group-count table 163 includes an entry for each group of rows of the main memory 160, and may be indexed by a subset of bits in their row identifiers 105 (i.e., row address). Accordingly, all rows in a group will map to the same entry in the group-count table 163.

Each counter in the group-count table 163 maintains only an aggregated count over all the rows in the associated group. Each counter in the group-count table 163 can have a count value ranging from zero to $T_G$. Initially all of the counts are initialized to zero. When an activation is received by the memory controller 150, the memory controller uses the row identifier 105 associated with the activation to determine the entry for the associated group in the group-count table 163. If the count value of the counter associated with the entry is less than $T_G$, the memory controller 150 increments the count value by one. If the count value equals $T_G$, the memory controller 150 leaves it at $T_G$ until the group-count table 163 is reset. Thus, a count value of $T_G$ in the entry for a group represents that entry is incapable of tracking counts for all of the rows in the group.

Accordingly, to facilitate count tracking for row in groups whose count has exceeded $T_G$, the memory controller 150 may use the row-count table 167. When the count value of the entry indexed by the row becomes $T_G$, the memory controller 150 switches from group tracking to per-row tracking for all the rows in that group. To provide the flexibility of having an arbitrary number of per-row tracking entries, memory controller 150 maintains the row-count table 167 in a reserved area of the main memory 160 (accessible by the memory controller 150)

In some embodiments, the row-count tracker 167 may be organized as an untagged table of counters, with one counter for each row in the main memory 160. Each entry in the row-count table 167 may be sized to count up to $T_H$. The total size of the row-count table 167 may be quite small compared to the total memory capacity of the main memory 160. For example, to support $T_H$ of 250, each entry in the row-count table 167 is 1-byte. A 32 GB main memory 160 contains 4 million rows (8 KB each). So, the total size of the row-count table 167 is 4 MB (less than 0.02% of the 32 GB main memory 160).

The memory controller 150 may access an entry in the row-count table 167 only for the rows whose group count has reached $T_G$ in the group-count table 163. To maintain reliable counts, when the memory controller 150 increments a count value from $T_G$-1 to $T_G$ for a group entry in the group-count table 163 the memory controller 150 may initialize the count values of all row-count table 167 entries for the rows in the group to $T_G$. In some embodiments, 128 rows may be in each group. To make the process of initializing the entries in the row-count table 167 more efficient, indexing may be used in the such that 64 consecutive rows map go to the same entry in the group-count table 163.

As the entries in the row-count table 167 for these 64 rows are resident in the same memory line (64 bytes), the process of updating entries in the row-count table 167 for a group to $T_G$ would require just two line reads and two line writes to the main memory 160. Overhead for the update is negligible as it is incurred at most once in 64 ms for a group, and only after the group has $T_G$ activations.

Because the row-count table 167 is a memory mapped structure, accesses to the row-count table may incurs high latency. Accordingly, to improve performance the row-count cache 165 may be used. Typical metadata caches for caching the information stored in memory-mapped structures (e.g., for row-counts of CRA and encryption-counters for secure memories) are organized similar to conventional caches: they use 64-byte granularity and memory address for tagging. Unlike these metadata caches, the row-count cache 165 may be organized at the granularity of a single row-count table 167 entry (to avoid the reliance on spatial locality in accesses to different rows in memory, as such accesses tend to have much poor spatial locality compared to the spatial locality found in accesses to different lines of a page) and may use the row address for the purpose of indexing and identification (to reduce the tagging overhead). The row-count table 167 may be set-associative.

In some embodiments, each entry in the row-count cache 165 may include a valid bit, a tag for the row-address in the row-count table 167, and the corresponding count value of the row-count table 167 for the row. The memory controller 150 may access the row-count table 167 only for rows for which the group-count table 163 count has reached $T_G$. If the access to the row-count cache 165 is a hit, the memory controller 150 may get the count value for the row, and may update it locally within the row-count cache 165. However, if there is a miss, then the memory controller 150 may access the memory line storing the row-count table 167 entry for the given row and may install it in the row-count cache 165.

This install can evict a valid entry in the row-count cache 165 (guaranteed to be dirty if valid), in which case, the row-count table 167 must be updated to include the evicted entry. In some embodiments, this may be done by the memory controller 150 fetching the memory line that stores the row-count table 167 entry for the row represented by the evicted entry, updating the row-count table 167 entry of that row with the new count value, and writing back this memory line to the main memory 160.

Depending on the embodiment, the row-count table 167 must be sized to accommodate the state for the rows that have activation counts exceeding $T_G$. At most a few thousand rows have a large number of activations within the interval of 64 ms. In some embodiments, a row-count table 167 containing 8K-entries (4K-entries per rank) may be provisioned. Each row-count cache 165 entry requires 3 bytes (including tag).

The memory device 100 described herein provides a storage and performance-efficient way to track activation counts. In general, updating the activation count by the memory controller 150 for a row can be classified into three categories, based on which structure services the request. The categories are described below:

Category 1) The common case is that the request indexes into the group-count table 163 and increments a corresponding count value in the group-count table 163. If the count value remains less than $T_G$, no further action is required by the memory controller 150. This alone is sufficient for most of the requests.

Category 2) The request indexes into the group-count table 163 initially and finds that the count value for the entry equals $T_G$. Then, it accesses the row-count cache 165 and finds a hit. The counter associated with the entry ion the row-count cache 165 is increment. If the count reaches $T_H$, a mitigation is performed, and the count is reset to zero.

Category 3) This is the same as (3), except that the request encounters a miss for the entry in the row-count cache 165. The corresponding entry in the row-count table 167 is fetched from in the row-count table 167 and is installed in the row-count cache 165 (and any evicted entry is written back). The count associated with the entry is incremented. If the counter reaches $T_H$, a mitigation is performed, and the count is reset to zero.

The estimated row counts can be imprecise. In a best-case scenario, the count value in the group-count table 163 for a row of a group does not get any updates from any other row in the group. In this case, the counting will be precise, and a RH mitigation will be issued only after $T_H$ activations. In a worst case scenario, a row of a group is activated for a first time after the corresponding entry in the group-count table 163 has already reached $T_G$. In this case, a mitigation can be issued for the row after it performs ($T_H$-$T_G$) activations. However, if the row continues to receive many activations, then the system will ensure that subsequent mitigations are performed at the rate of once every $T_H$ activations, similar to perfect tracking.

Figure 2:
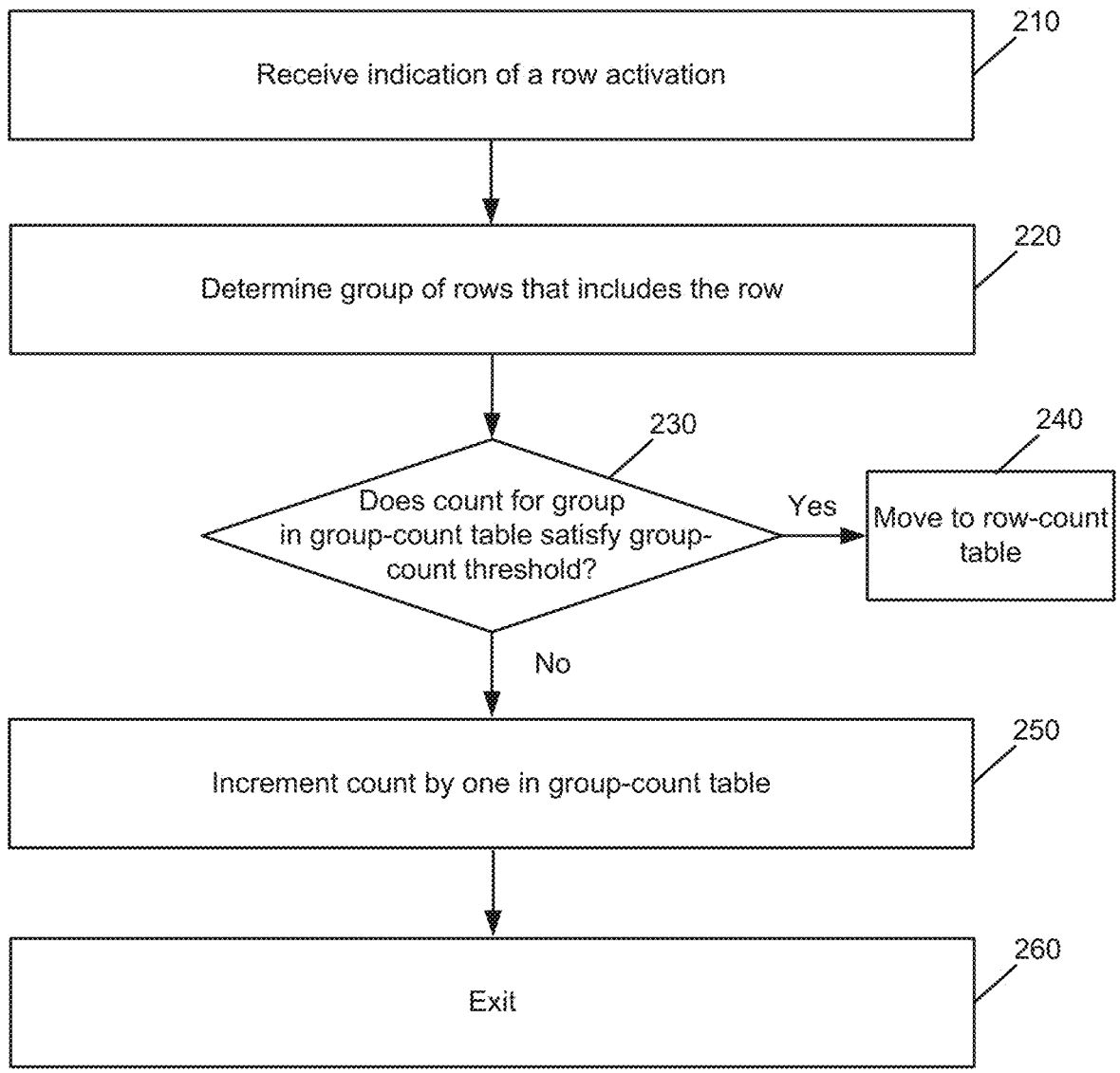
FIG. 2 is an illustration of an example method for row hammer mitigation using a group-count table.

FIG. 2 is an illustration of an example method 200 for row hammer mitigation using a group-count table. The method 200 may be implemented by a memory controller 150 of a memory device 100.

At 210, an indication of a row activation is received. The indication may be received by the memory controller 150. The row activation may be associated with a read or write operation performed on a row of a main memory 160 of the memory device 100. The indication of a row activation may include a row identifier 105 (e.g., address) of the row of the main memory that is being activated. The main memory 160 may be DRAM.

At 220, a group of rows that includes the row associated with the activation is determined. The determination may be made by the memory controller 150. Each row of the plurality of rows of the main memory 160 may be assigned to a group based on the address or row identifier 105. Depending on the embodiment, there may be approximately 128 rows assigned to each group.

At 230, whether the count for the group in the group-count table satisfies a group-count threshold is determined. The determination as to whether the count associated with the group satisfies $T_G$ may be made by the memory controller 150. In some embodiments, the count for a group may satisfy $T_G$ when the count is equal to $T_G$. If the count satisfies $T_G$, then the method 200 may continue to 240. Else, the method 200 may continue to 250.

At 240, the row-count table is utilized. The count for the group in the group-count table 163 being equal to the $T_G$ indicates that the count for the indicated row should be tracked in the row-count table 167 and not the group-count table 163. Accordingly, the memory controller 150 may exit the method 200 may exit and continue to the method 300 where the row-count table 167 may be used.

At 250, the count associated with the group in the group-count table is incremented. The count may be incremented by the memory controller 150. Any method for incrementing a count may be used.

At 260, the method may exit. The memory controller 150 may exit after incrementing the count associated with the row. In some embodiments, before exiting, the memory controller 150 may first determine if the count value, after being incremented, is now equal to the $T_G$. If so, the memory controller 150 may, for each row of the main memory 160 associated with the group, set the count for the row in the row-count table 167 to $T_G$. Any method for updating a count value may be used.

Figure 3:
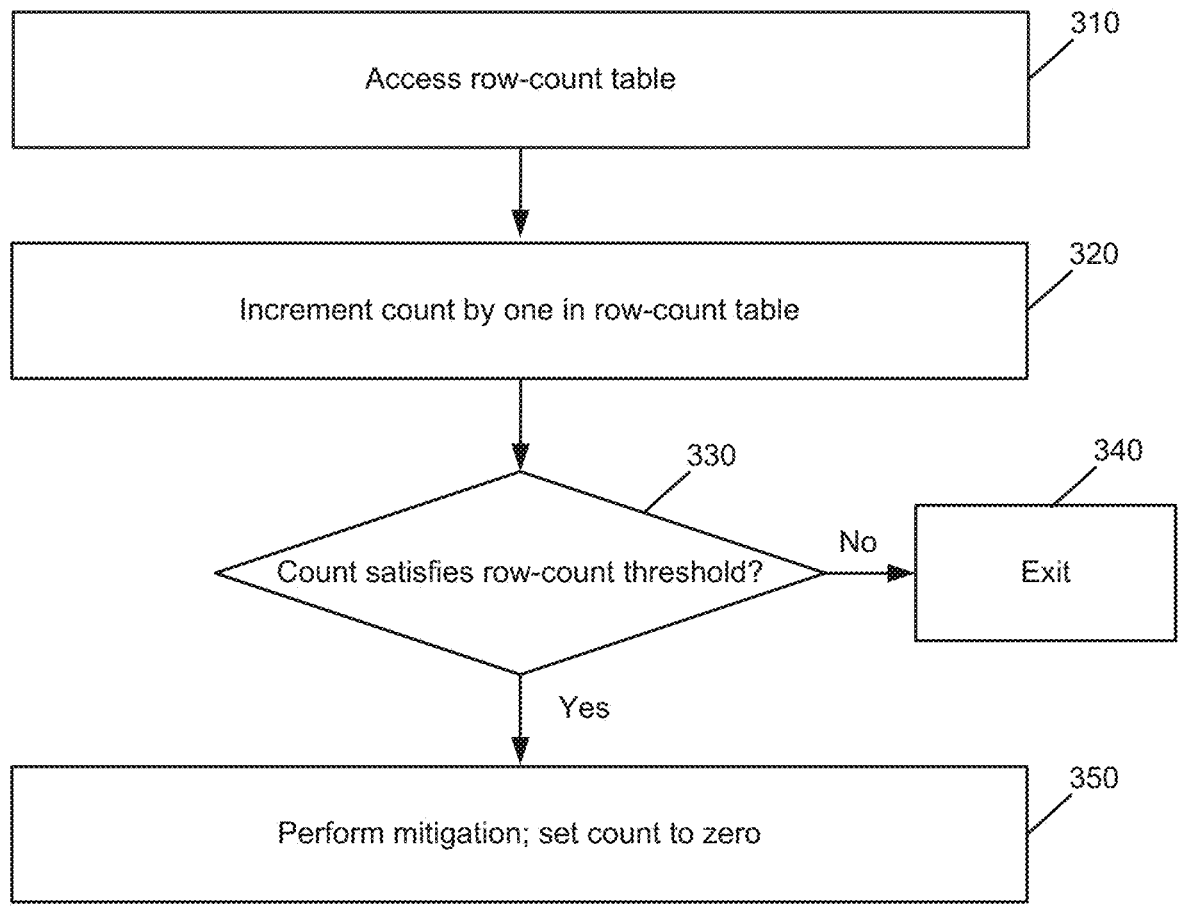
FIG. 3 is an illustration of an example method for row hammer mitigation using a row-count table.

FIG. 3 is an illustration of an example method 300 for row hammer mitigation using a row-count table. The method 300 may be implemented by the memory controller 150 of the memory device 100.

At 310, the row-count table is accessed. The row-count table 167 may be accessed by the memory controller 150. The row-count table 267 may be stored in a reserved portion of the main memory 160 (e.g., DRAM), while the group-count table 163 may be stored in SRAM. The memory controller 150 may be accessing an entry in the row-count table 167 corresponding to a row that was activated as part of a read or write operation on the row. Depending on the embodiment, rather than access the row-count table 167 directly, the memory controller 150 may access a row-count cache 165. This implementation is described further with respect to the method 400.

At 320, the count associated with the row in the row-count table is incremented. The count may be incremented by the memory controller 150. Any method for incrementing a count may be used.

At 330, whether the count satisfies a row-count threshold is determined. Whether the count for the row satisfies $T_H$ may be determined by the memory controller 150. The count may satisfy $T_H$ when it is equal to $T_H$. If the count satisfies $T_H$ then the method 300 may exit at 340. Else, the method 300 may continue at 350.

At 350, row hammer mitigation is performed. The row hammer mitigation may be performed by the memory controller 150 on some number of rows that are near the the row whose count exceeded $T_H$. Any method for performing row hammer mitigation may be used. In addition, after performing the mitigation, the count associated with the row in the row-count table 167 may be reset to zero.

Figure 4:
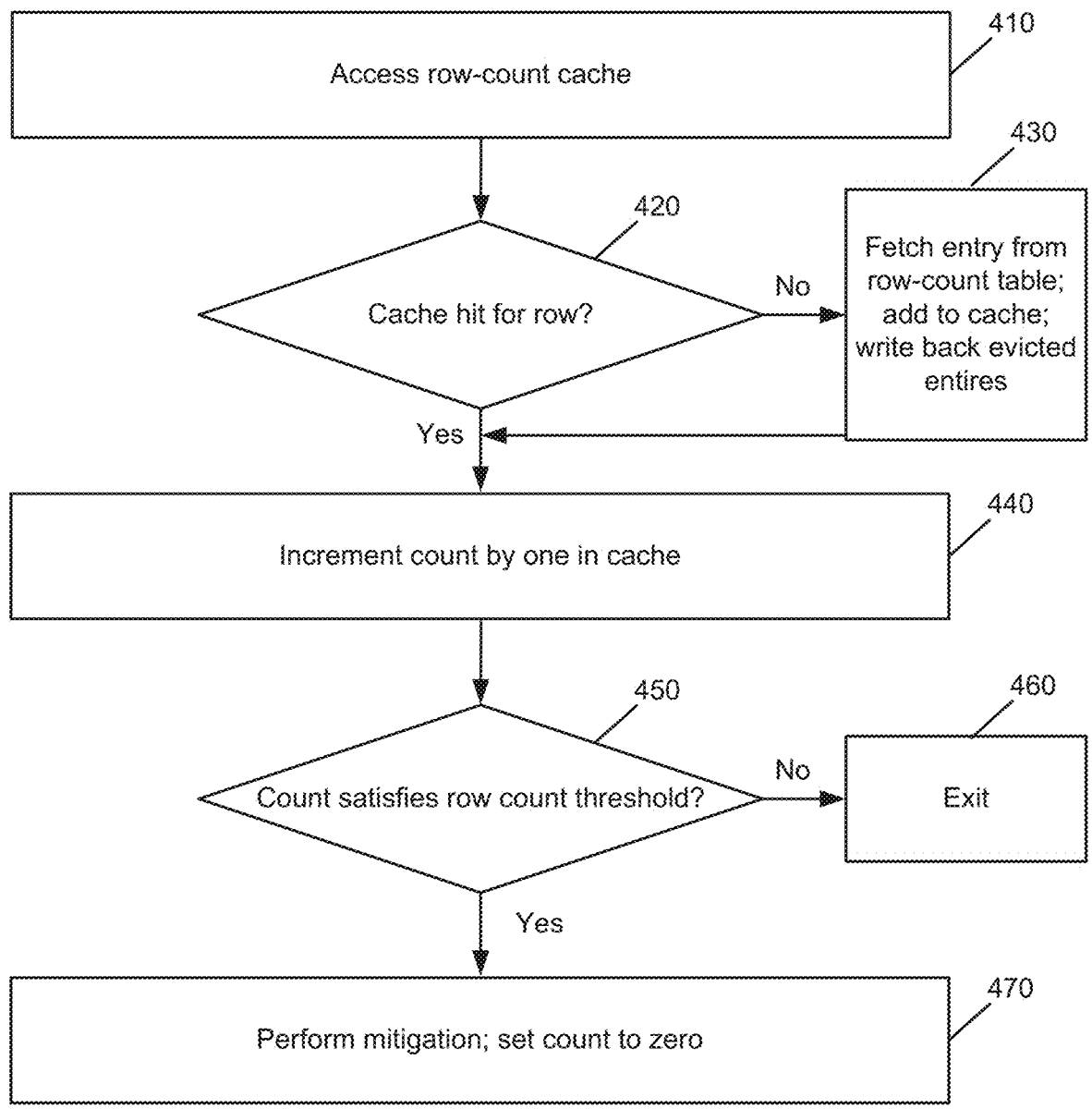
FIG. 4 is an illustration of an example method for row hammer mitigation using a row-count cache.

FIG. 4 is an illustration of an example method 400 for row hammer mitigation using a row-count cache. The method 400 may be implemented by the memory controller 150 of the memory device 100.

At 410, the row-count cache is accessed. The row-count cache 165 may be accessed by the memory controller 150. The row-count cache 165 may cache some of the row-count table 167, and may be stored in SRAM associated with the memory controller 150. The memory controller 150 may be accessing an entry in the row-count cache 165 corresponding to a row that was activated as part of a read or write operation on the row.

At 420, whether there is a cache hit for the row is determined. The determination may be made by the memory controller 150. A cache hit for a row may occur when there is an entry for the row in the row-count cache 165, and a miss may occur when there is no entry for the row in the row-count cache 165. If there is a cache miss, the method may continue at 430. Else, the method may continue at 440.

At 430, the entry for the row is fetched from the row-count table 167. The entry for the row may be fetched from the row-count table 167 by the memory controller 150 from the main memory 160. The fetched row may then be added to the cache 165 by the memory controller 150. In addition, any entries from the row-count cache 165 that were evicted from the cache 165 due to the add may be written back to the row-count table 167.

At 440, the count associated with the row in the row-count cache is incremented. The count may be incremented by the memory controller 150. Any method for incrementing a count may be used.

At 450, whether the count satisfies a row-count threshold is determined. Whether the count for the row satisfies $T_H$ may be determined by the memory controller 150. The count may satisfy $T_H$ when it is equal to $T_H$. If the count does not satisfy $T_H$ then the method 400 may exit at 460. Else, the method 400 may continue at 470.

At 470, row hammer mitigation is performed. The row hammer mitigation may be performed by the memory controller 150 on some number of rows that are near the row whose count exceeded $T_H$. Any method for performing row hammer mitigation may be used. In addition, after performing the mitigation, the count associated with the row in the row-count cache 165 and the row-count table 167 may be reset to zero.

Figure 5:
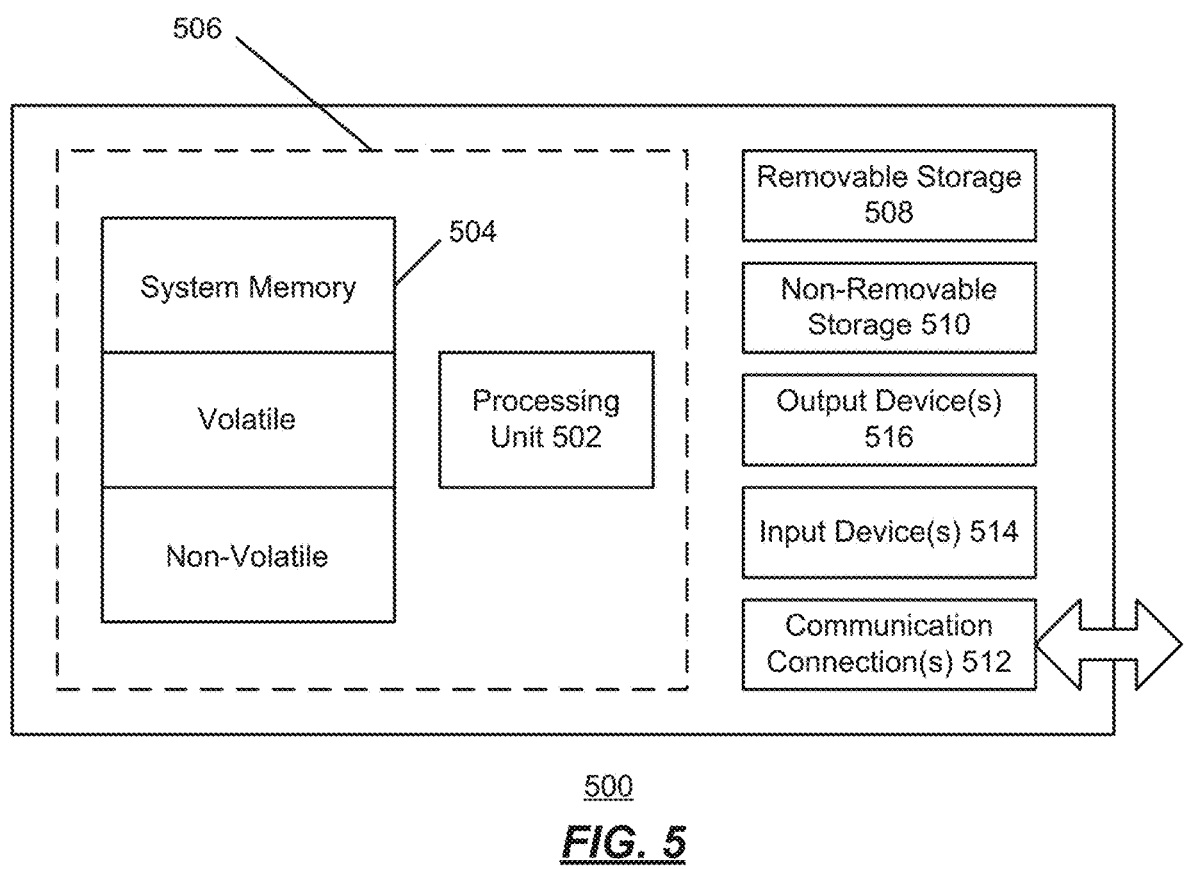
FIG. 5 illustrates an example computing device.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by the device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of computing device 500.

Computing device 500 may contain communication connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for Row-hammer mitigation comprising:
   determining that a row of a plurality of rows of a DRAM module has been activated, wherein the DRAM module is part of a memory device comprising the DRAM module and an SRAM module; and
   in response to the determination that the row has been activated:
   determining a group of rows of a plurality of groups of rows that includes the row that has been activated, wherein each group of rows includes a unique subset of rows of the plurality of rows and each row of the plurality of rows is included in a group of rows of the plurality of groups of rows;
   determining that a count associated with the group of rows in a group-count table satisfies a group-count threshold, wherein the group-count table is stored in the SRAM module and not in the DRAM module, and wherein the group-count table includes a different count for each group of rows of the plurality of rows;
   in response to determining that the count associated with the group of rows satisfies the group-count threshold:
      incrementing a count associated with an entry for the row in a row-count table, wherein the row-count table is stored in the DRAM module and not in the SRAM module;
      determining that the count associated with the entry for the row in the row-count table satisfies a row-count threshold; and
      in response to the determination that the count associated with the entry for the row in the row-count table satisfies the row-count threshold, performing row hammer mitigation.

2. The method of claim 1, further comprising:
   determining that the count associated with the group of rows in the group-count table does not satisfy the group-count threshold; and
   in response to the determination that the count associated with the group of rows in the group-count table does not satisfy the group-count threshold, increment the count associated with the group of rows in the group-count table.

3. The method of claim 1, further comprising:
   after performing the row hammer mitigation, setting the count associated with the entry for the row that has been activated to zero.

4. The method of claim 1, wherein the count associated with the group of rows in the group-count table satisfies the group-count threshold when the count is equal to the group-count threshold.

5. The method of claim 1, wherein the count associated with the entry for the row satisfies the row-count threshold when the count is equal to the row-count threshold.

6. The method of claim 1, wherein each row of the plurality of rows is only in one group of rows of the plurality of groups of rows.

7. The method of claim 1, further comprising maintaining a row-count cache of the row-count table.

8. The method of claim 7, wherein the row count cache is maintained in the SRAM module.

9. The method of claim 1, wherein the method is performed by a memory controller of the memory device.

10. A memory device comprising:
   a memory controller;
   an SRAM module; and
   a DRAM module comprising a plurality of rows, wherein the memory controller is adapted to:
      determine that a row of the plurality of rows of the DRAM module has been activated; and
      in response to the determination that the row has been activated:
         determine a group of rows of a plurality of groups of rows that includes the row that has been activated, wherein each group of rows includes a unique subset of rows of the plurality of rows and each row of the plurality of rows is included in a group of rows of the plurality of groups of rows;
         determine that a count associated with the group of rows in a group-count table satisfies a group-count threshold, wherein the group-count table is stored in the SRAM module and not in the DRAM module, and wherein the group-count table includes a different count for each group of rows of the plurality of rows;
         in response to determining that the count associated with the group of rows satisfies the group-count threshold:
            increment a count associated with an entry for the row in a row-count table, wherein the row-count table is stored in the DRAM module and not in the SRAM module;
            determine that the count associated with the entry for the row in the row-count table satisfies a row-count threshold; and
            in response to the determination that the count associated with the entry for the row in the row-count table satisfies the row-count threshold, perform row hammer mitigation.

11. The memory device of claim 10, wherein the memory device is further adapted to:
   determine that the count associated with the group of rows in the group-count table does not satisfy the group-count threshold; and
   in response to the determination that the count associated with the group of rows in the group-count table does not satisfy the group-count threshold, increment the count associated with the group of rows in the group-count table.

12. The memory device of claim 10, wherein the memory device is further adapted to:
   after performing the row hammer mitigation, set the count associated with the entry for the row that has been activated to zero.

13. The memory device of claim 10, wherein the count associated with the group of rows in the group-count table satisfies the group-count threshold when the count is equal to the group-count threshold.

14. The memory device of claim 10, wherein the count associated with the entry for the row satisfies the row-count threshold when it is equal to the row-count threshold.

15. The memory device of claim 10, further comprising maintaining a row-count cache of the row-count table.

16. A memory device comprising:
   a memory controller;
   an SRAM module; and
   a DRAM module comprising a plurality of rows, wherein the memory controller is adapted to:
      determine that a row of the plurality of rows of the DRAM module has been activated; and
      in response to the determination that the row has been activated:
         determine a group of rows of a plurality of groups of rows that includes the row that has been activated, wherein each group of rows includes a unique subset of rows of the plurality of rows and each row of the plurality of rows is included in a group of rows of the plurality of groups of rows;
         determine whether a count associated with the group of rows in a group-count table is less than a group-count threshold, wherein the group-count table is stored in the SRAM module and not in the DRAM module;

if it is not determined that the count associated with the group of rows is less than the group-count threshold:
  increment a count associated with an entry for the row in a row-count table, wherein the row-count table is stored in the DRAM module and not in the SRAM module;
  determine that the count associated with the entry for the row in the row-count table is not less than a row-count threshold; and
  in response to the determination that the count associated with the entry for the row in the row-count table is not less than the row-count threshold, perform row hammer mitigation; and
  after performing the row hammer mitigation, set the count associated with the entry for the row that has been activated to zero;
if it is determined that the count associated with the group of rows is less than the group-count threshold:
increment the count associated with the group of rows in the group-count table.

\* \* \* \* \*